(12) United States Patent
Haruna et al.

(10) Patent No.: US 7,317,546 B2
(45) Date of Patent: Jan. 8, 2008

(54) CERTIFICATION METHOD AND DEVICE AND CERTIFICATE ISSUER SYSTEM

(75) Inventors: Tomomi Haruna, Tokyo (JP); Yoshiisa Inoue, Tokyo (JP); Shigeyuki Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 907 days.

(21) Appl. No.: 09/916,395

(22) Filed: Jul. 27, 2001

(65) Prior Publication Data
US 2002/0012133 A1 Jan. 31, 2002

(30) Foreign Application Priority Data
Jul. 27, 2000 (JP) ............... 2000-231381

(51) Int. Cl.
*G06F 15/00* (2006.01)
(52) U.S. Cl. .................. 358/1.15; 358/1.12; 707/2; 707/3; 715/741
(58) Field of Classification Search .............. 358/1.15; 707/1–10; 715/741
See application file for complete search history.

(56) References Cited

U.S. PATENT DOCUMENTS

| | | | | |
|---|---|---|---|---|
| 5,765,155 A | * | 6/1998 | Nakamura | 707/10 |
| 5,832,497 A | * | 11/1998 | Taylor | 707/104.1 |
| 5,884,271 A | * | 3/1999 | Pitroda | 705/1 |
| 5,995,965 A | * | 11/1999 | Experton | 707/10 |
| 6,008,727 A | * | 12/1999 | Want et al. | 340/572.1 |
| 6,108,788 A | * | 8/2000 | Moses et al. | 713/201 |
| 6,125,349 A | * | 9/2000 | Maher | 705/1 |
| 6,134,328 A | * | 10/2000 | Cordery et al. | 380/55 |
| 6,145,740 A | * | 11/2000 | Molano et al. | 235/380 |
| 6,249,226 B1 | * | 6/2001 | Harrison et al. | 340/572.1 |
| 6,330,544 B1 | * | 12/2001 | Walker et al. | 705/14 |
| 6,581,044 B1 | * | 6/2003 | Alur | 705/59 |
| 6,658,568 B1 | * | 12/2003 | Ginter et al. | 713/193 |
| 6,842,741 B1 | * | 1/2005 | Fujimura | 705/59 |
| 2001/0025272 A1 | * | 9/2001 | Mori et al. | 705/76 |
| 2001/0044775 A1 | * | 11/2001 | Saito et al. | 705/40 |
| 2002/0057440 A1 | * | 5/2002 | Weiner et al. | 358/1.1 |
| 2003/0050899 A1 | * | 3/2003 | Tushie et al. | 705/65 |

\* cited by examiner

*Primary Examiner*—Twyler Lamb
*Assistant Examiner*—Mark R. Milia
(74) *Attorney, Agent, or Firm*—Townsend and Townsend and Crew LLP

(57) ABSTRACT

When a certificate is to be printed on a certificate form having a microchip built therein, an applicant for applying for the certificate sends microchip ID to a certificate issuer, and the certificate issuer stores certificate data in association with the microchip ID in an issue management database of the certificate issuer. When the certificate is to be verified, a certificate verifier sends the microchip ID built in the certificate to the certificate issuer, and in response to it, the certificate issuer sends the certificate data, which is registered in the certificate database in association with the microchip ID, to the certificate verifier. Certificate can be printed out by a print terminal at home or the like.

18 Claims, 6 Drawing Sheets

FIG.3A

CERTIFICATE DATABASE

| PERSONAL CERTIFICATION ID | PERSONAL IDENTIFICATION NUMBER | MAIL ADDRESS | IDENTITY PAPERS | CERTIFICATE DATA |
|---|---|---|---|---|
| 172454633 | ＊＊＊＊ | abc@def.ne.jp | RESIDENT'S CARD/ DRIVING LICENSE | 172454633.dat |
| 172454634 | ＊＊＊＊ | ghi@jkl.ne.jp | RESIDENT'S CARD/ PASSPORT | 172454634.dat |
| . | ＊＊＊＊ | . | . | . |
| . | ＊＊＊＊ | . | . | . |
| . | ＊＊＊＊ | . | . | . |

FIG.3B

ISSUE MANAGEMENT DATABASE

| μ CHIP ID | PERSONAL CERTIFICATION ID | EXPIRATION DATE | VALID ACCESS NUMBER-OF-TIMES | ACCESS HISTORY |
|---|---|---|---|---|
| 2000021000002159 | 172454633 | 20000510 | 3 | 2000021000002159.log |
| 2000022700001483 | 172454634 | 20000527 | 1 | |
| . | . | . | . | . |
| . | . | . | . | . |
| . | . | . | . | . |

FIG.3C

ACCESS HISTORY

| DATE | ACCESS SOURCE |
|---|---|
| 20000217 | 218.313.104.092 |
| 20000219 | 203.431.202.003 |
| . | . |

CERTIFICATION METHOD AND DEVICE AND CERTIFICATE ISSUER SYSTEM

BACKGROUND OF THE INVENTION

The present invention relates to a certificate issuing/verifying method and a certificate issuing system in which a certificate can be printed out or verified at home, office, or any other place.

Heretofore, when a person wanted to follow an administrative procedure typical of issue of a certificate such as a certificate of the person's seal impression, a resident's card, or the like, he/she had to personally go to the window of a city office, a ward office, a town office, or a village office. In order to obtain certificates conveniently, automatic issuing machines for issuing the above-mentioned certificates are installed at the city office, the community centers, the tourist information center of the JR Utsunomiya Station, or the like, in Utsunomiya City since Sep. 9, 1999. In addition, a plan to install the automatic issuing machines sequentially at all the post offices in Japan is started since 2000. A technique in which the applicants can print out stamps, prescriptions, or the like, from terminals is also under development.

However, in the conventional certificate issuing system, even if issuing machines have been increased, there still remains a problem that the applicant cannot obtain a required certificate unless he/she goes to the place where any one of such exclusive certificate issuing machines is located.

SUMMARY OF THE INVENTION

An object of the present invention is to provide a certificate issuing system in which a certificate can be issued at an applicant's home or the like where no exclusive certificate issuing machine is located, and to provide a system in which the issued certificate can be verified.

Heretofore, "certificate" has a broad meaning and typically refers to a document authorized by the person other than the person who printed the document. For example, a "certificate" in accordance with the present invention, includes, but is not limited to, a resident's card, also a ticket indicated authenticity, the copy of the applicant's family register, the certificate of the applicant's seal impression, social security card, health card, gift certification, check.

In order to achieve the above object, according to the present invention, there is provided a certificate issuing system constituted by a print form with a microchip built therein (attached thereto), a print terminal and a certificate issuer system.

The print terminal has a microchip reading device. The certificate issuer has a certificate database, and an issue management database. The print terminal and the certificate issuer are connected to each other on a network.

When a person wants to apply for a certificate (hereinafter simply referred to as "applicant"), the applicant has to, first, acquire "personal certification ID" for verifying the identity of the applicant. In exchange for the "personal certification ID", "personal identification number (code number)", and the "microchip ID" read by the microchip reading device, or the like, the applicant obtains "certificate data" such as a certificate of the applicant's seal impression or the resident's card in association with his/her "personal certification ID" from the certificate issuer on the network. Then, the applicant uses the print terminal having the microchip reading device to print the obtained "certificate data" on a print form with a microchip built therein.

When the applicant submits the certificate printed on the print form having the built-in microchip to a merchant such as a real estate agent or the like, the merchant can verify the authenticity of the submitted certificate in the following manner. That is, when the merchant wants to verify the certificate received from the applicant, the merchant uses a microchip reading device of a verification terminal to read the "microchip ID" in the print form having the built-in (attached) microchip, and refers to an issue management database of the certificate issuer through a communication interface. Then, the merchant refers to the "issue management data" in association with the read "microchip ID" so as to verify the authenticity of the submitted certificate.

Incidentally, the above-mentioned "ID" means identification, that is, the identification number. For example, the "personal certification ID" means a number which is an applicant-specific identification number such as a health card number, a pension number, or the like and by which the applicant can be uniquely identified.

DESCRIPTION OF THE EMBODIMENTS

Embodiments according to the present invention will be described below with reference to the drawings. Incidentally, in the drawings of the embodiments, one and the same reference number is attached to a part or an equivalent common to each other, and the repeated description thereof is omitted.

Figure 1:
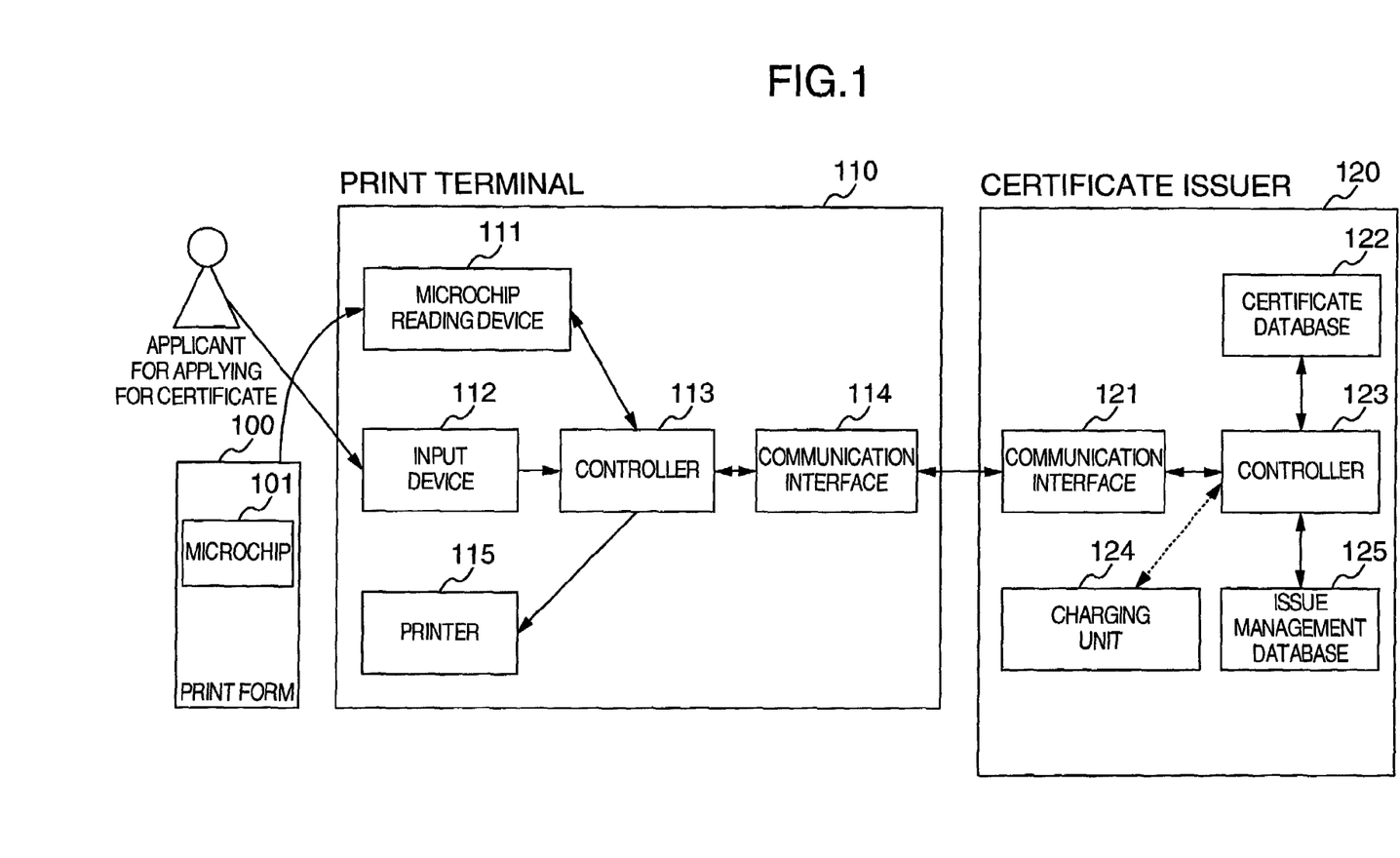
FIG. 1 is a block configuration diagram showing an embodiment of the present invention.

FIG. 1 shows a block configuration diagram of an electronic issued management system according to the present invention. As shown in FIG. 1, the electronic issue management system according to the present invention is constituted by a print form 100, a print terminal 110 and a certificate issuer (a data manager) 120. The print form 100 has an electronic circuit chip (hereinafter referred to as "microchip") 101 which is attached to or built in the print form 100 and which stores microchip ID number showing its uniqueness. The "microchip ID" means a number to identify the microchip. This microchip may be a read only chip, or a read/write chip. Further, for example, when the read only chip is used as the microchip, the data contents as the contents stored in the microchip is formed into the format of "microchip ID" or the format of "microchip ID" and "digital signature". On the other hand, when the read/write chip is used, the data contents to be written in the read/write chip may be constituted, for example, by, "KEY" and "digital signature" or the like. The "KEY" means a key for decrypting encrypted data when the data such as ID or the like is encrypted and sent/received for the purpose of security improvement. In addition, data stored in the microchip can be read/written by a non-contact apparatus.

The print terminal 110 is constituted by a microchip reading device 111, an input device 112, a controller 113, a printer 115, and a communication interface 114. The controller 113 of the print terminal 110 receives certificate data from the certificate issuer 120 through the communication interface 114 and uses the printer 115 to print the certificate data on the print form 100. Further, the controller 113 of the print terminal 110 sends the "personal certification ID" and the microchip ID to the certificate issuer through the communication interface 114 while the "personal certification ID" is inputted by the applicant through the input device 112 and the microchip ID built in the print form 100 is read by the microchip reading device 111. Incidentally, in the embodiment, description has been made about the case where the print terminal 110 is an integrated terminal including the microchip reading device 111, the input device 112, the controller 113, the printer 115 and the communication interface 114. However, apparatuses in which, for example, a reader which is the reading device 111 for reading the microchip, a printer apparatus which is the printer 115, and a personal computer having the input device 112, the controller 113 and the communication interface 114 may be used in combination, may be used. It does not matter whether apparatus is constituted by integrated members or the apparatus has separate members in combination.

The certificate issuer 120 is constituted by a communication interface 121, a certificate database 122 which is a certificate data storage device, a controller 123, a charging unit 124, and an issue management database 125 which is an issue management storage device. The controller 123 of the certificate issuer 120 retrieves, from the certificate database 122, the certificate data in association with the personal certification ID received through the communication interface 121, and sends the certificate data to the printer terminal through the communication interface 121. Although description is not particularly made in the embodiment, the certificate issuer 120 may be further constituted by a further charging unit, so that the fee for issuing the certificate can be charged to the applicant on-line, off-line, or the like.

In this embodiment, although description is made about the case where the certificate database 122 is present in the certificate issuer 120 on the assumption that the certificate issuer 120 is managed by a self-governing body, the certificate issuer 120 may be operated by an entity different from the self governing body and the certificate database 122 may be provided outside the certificate issuer 120.

Figure 2:
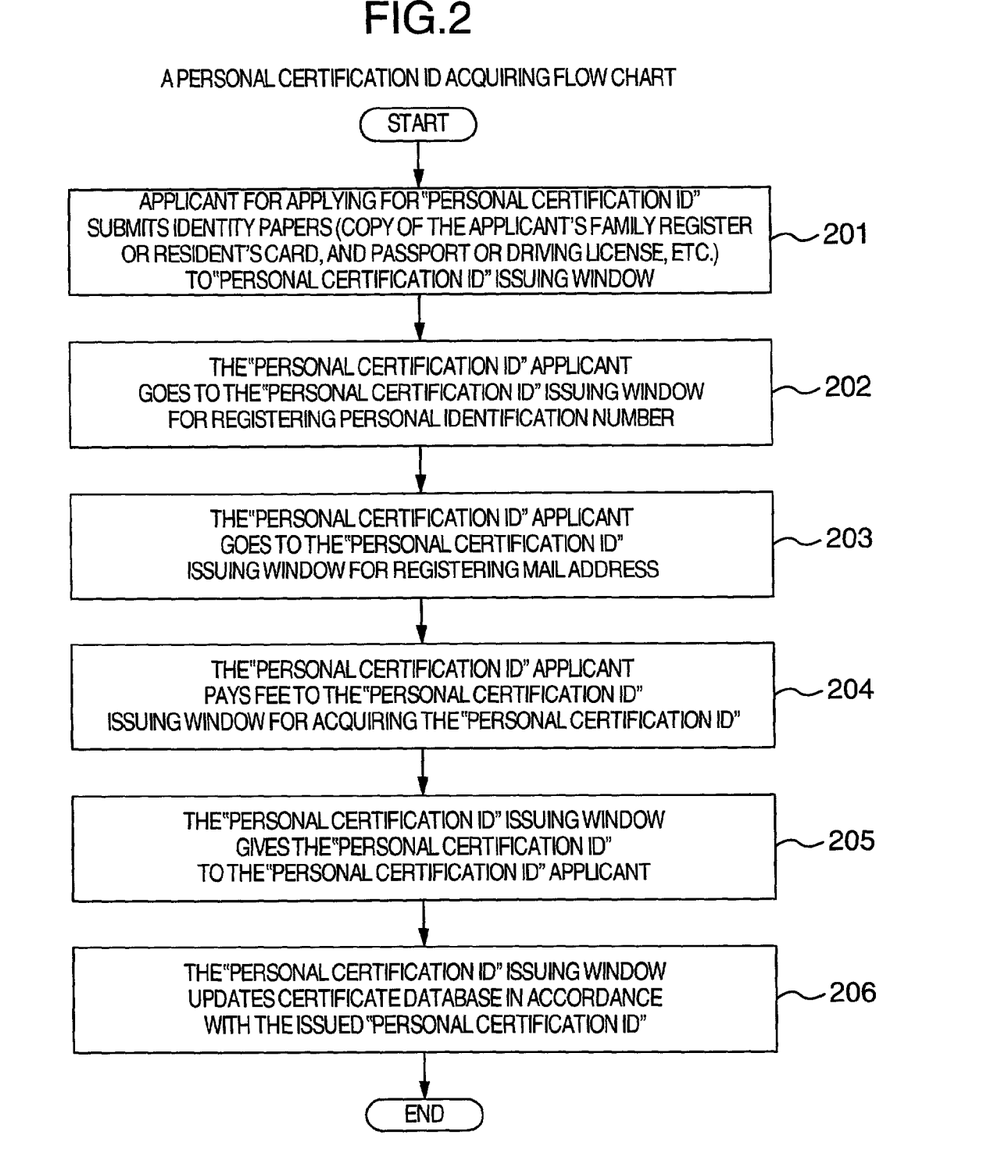
FIG. 2 is a personal certification ID acquiring flow chart.

Next, with reference to FIG. 2, the process flow chart in which an applicant acquires "personal certification ID", by which the issuer certifies the identity of the applicant, from a "personal certification ID" window (terminal).

First, the applicant who desires to apply for the "personal certification ID" submits identity papers for certifying the identity of the applicant to the certificate issuer. These papers may be also sent digitally (Step 201). In the embodiment, as the identity papers used to verify the applicant having the "personal certification ID", one of the social security card, a copy of the applicant's family register and the resident's card, and the passport or driving license are required, combination of at least one of the health card, the National Pension certificate, the student's identification card, the staff's identification card, the certificate of qualifications may be used.

Next, the applicant for applying for the "personal certification ID" goes to the "personal certification ID" issuing window to register his/her personal identification number (Step 202) and mail address (Step 203). For example, if any third party has made access to the issue management database, the registered mail address or electronic mail address is used to notify the applicant of the access from the third party.

Next, the "personal certification ID" applicant pays the fee to the "personal certification ID" issuing window for acquiring the "personal certification ID" (Step 204). Then, the "personal certification ID" issuing window gives the "personal certification ID" to the "personal certification ID" applicant (Step 205).

Next, the "personal certification ID" issuing window updates the certificate database in accordance with the issued "personal certification ID" (Step 206), personal identification number submitted by the "personal certification ID" applicant to the "personal certification ID" issuing window, the mail address, the identity papers, and the certificate data. Although description is not particularly made in this embodiment, the existing certificate database may be converted into the format adapted for this system, or may be used directly if it can be used as the certificate database of this system directly. In addition, in the case of using the certificate of the applicant's registered seal impression or the like, image data of the copy of the seal impression or the like may be used as the format of the database.

Figure 3A:
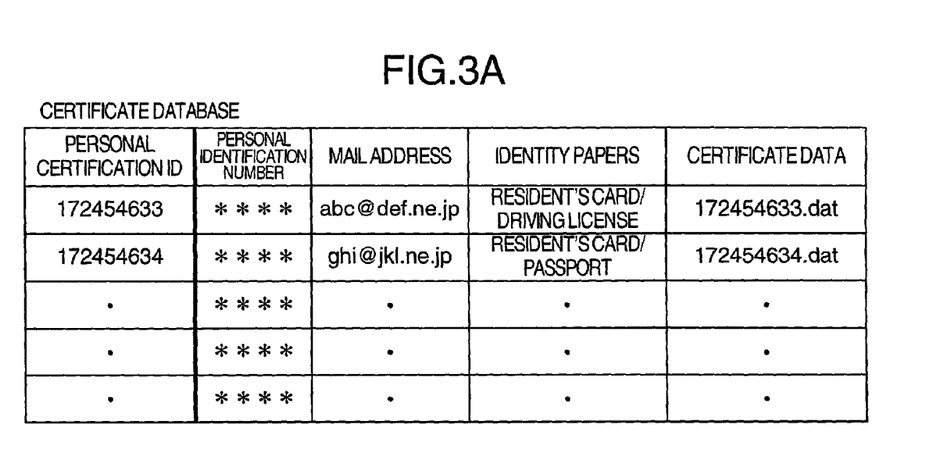
FIGS. 3A to 3C are tables showing the contents stored in a certificate database, an issue management database and an access history memory, respectively.

FIG. 3A shows a certificate database. The certificate database is constituted by "personal identification number", "mail address", "identity papers" and "certificate data" in association with the "personal certification ID". The certificate data is the data, for example, including the resident's card, the copy of the applicant's family register, the certificate of the applicant's seal impression, social security card, health card, ticket (concert, airplane, etc.), gift certification, check, etc. Although this embodiment has described the case where only one kind of certificate is issued by the certificate issuer, when a plurality of kinds of certificates are issued, the applicant may sent the "certificate kind to be applied" data from the print terminal for specifying a desired certificate. For example, in the case where an existing certificate database is converted into a format adapted for the system, in the embodiment, the operation for converting the existing certificate into the format adapted for the system is executed at the point of time when the "personal certification ID" is issued. However, the conversion operation may be carried out by the certificate issuer at the point of time when application of the certificate is received. The "personal certification ID" issuing window may be set up, for example, by the certificate issuer. Although the embodiment has described the case where the identity papers such as a resident's card, a driving license or the like may be used to verify the identity of applicant, any IC card or the like may be used to verify the applicant's identity if the applicant has the IC card. In this case, the identity can be verified on the network. Accordingly, unlike the embodiment, it is not necessary for the applicant to go to the "personal certification ID" issuing window in person. Further, when the IC card is used, the personal identification number inputting may be used to more improve the security of the identity verifying process. Although the embodiment has described the case where the mail address is registered when the "personal certification ID" is applied for, the mail address may be registered whenever the certificate is issued. In the case where the mail address is registered whenever the certificate is issued, the mail address together with the microchip ID is stored in the issue management database. Further, although the embodiment has described the case where notification is made by electronic mail, notification may be made by any other means such as postcard.

Figure 4:
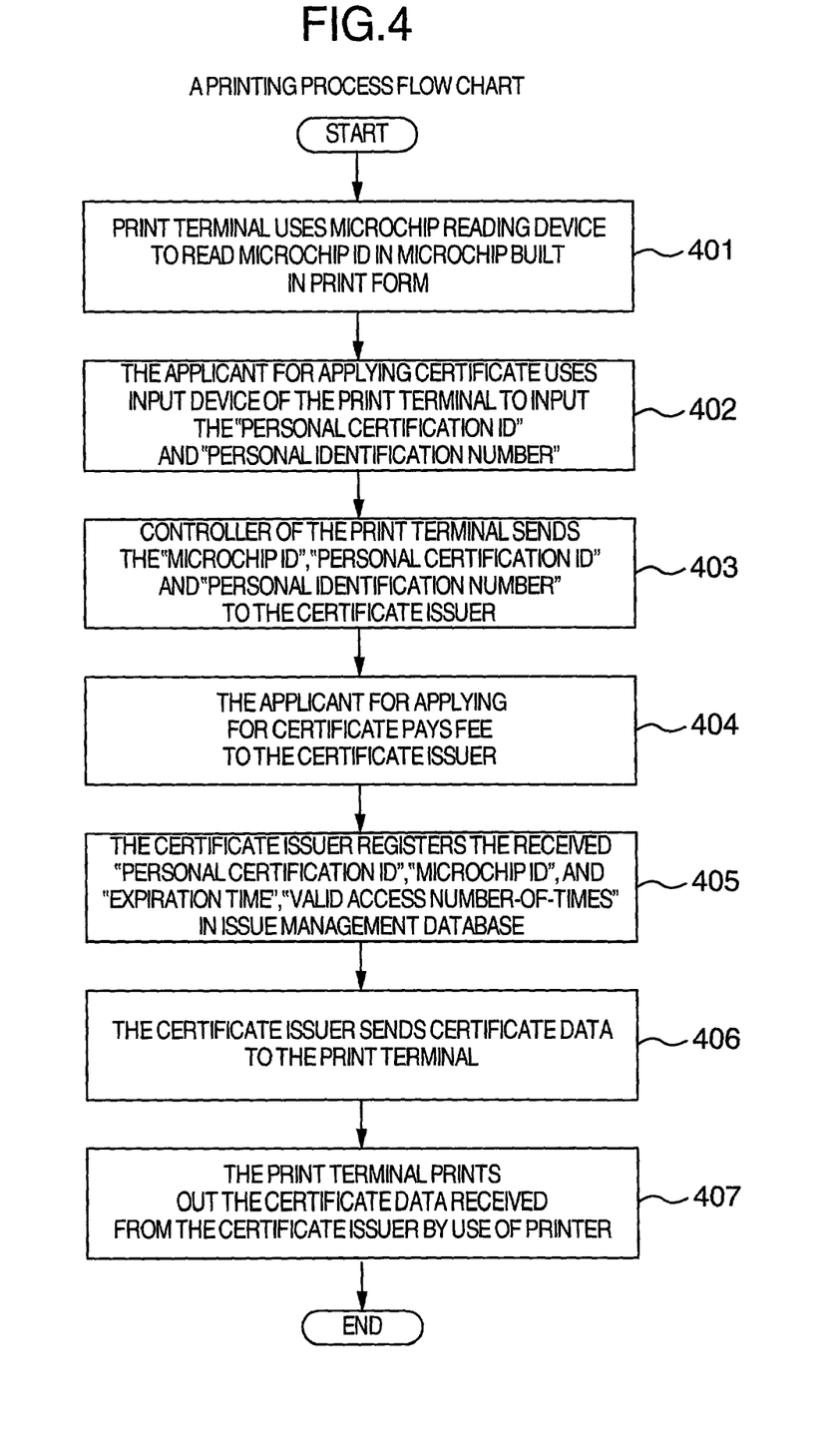
FIG. 4 is a printing process flow chart.

Next, with reference to FIG. 4, a flow in the case where a printer is used to print out a certificate on a microchip-built-in print form will be described.

First, a print terminal uses a microchip reading device to read microchip ID of the microchip built in the print form (Step 401). Next, when an applicant makes a request for issuing a certificate by means of the input device 112 of the print terminal 110, the applicant enters the "personal certification ID" and "personal identification number" by the input device (Step 402). Next, the controller 113 of the print terminal 110 sends the above-mentioned "microchip ID", "personal certification ID", and "personal identification number" to the certificate issuer (Step 403). The certificate issuer verifies the identity of the applicant by use of the "personal identification number" and the "personal certification ID". Then, the applicant pays the fee to the charging unit 124 of the certificate issuer 120 (Step 404). In the embodiment, although no particular description is made about the fee charging unit, cash, credit card, electronic money, or any other charging unit connected to the print terminal may be used as the charging unit.

Figure 3B:
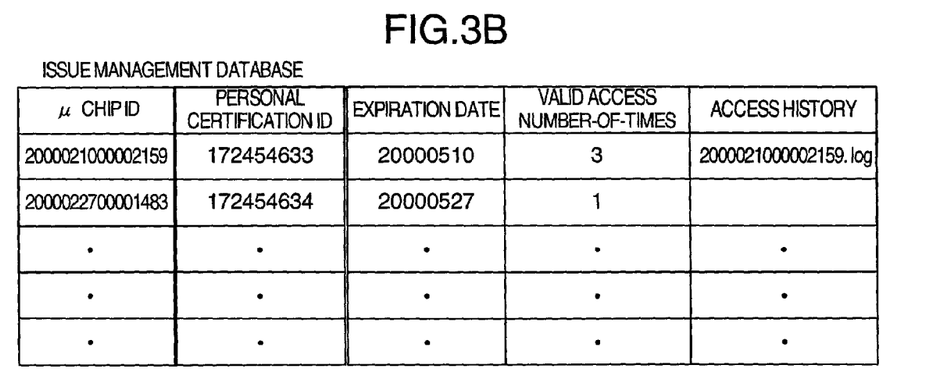
Figure 3C:
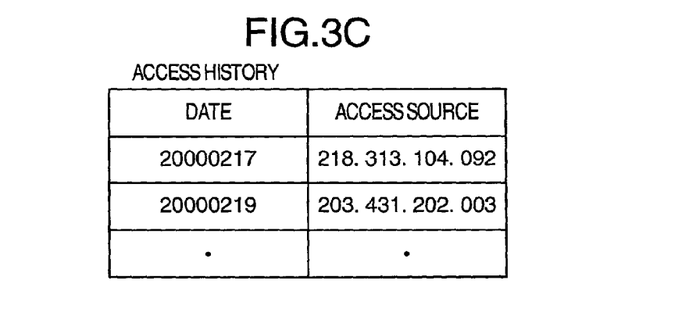

Next, the certificate issuer registers the received "microchip ID", "expiration time", and "valid access number-of-times" into the issue management database (step 405). FIG. 3B shows the contents registered in the issue management database. The issue management database is constituted by "microchip ID", "expiration time", "valid access number-of-times", and "access history". The "expiration time" shows the period during which the issued certificate is valid. For example, if three hundred yen is paid for the fee, "expiration time" may be set to three months. If five hundred yen is paid for the fee, the "expiration time" may be set to six months. Alternatively, the "expiration time" may be set by the applicant or may be set without variation by the certificate issuer. The "valid access number-of-times" means the number of times of access made by a third party (hereinafter referred to as "certificate verifier") to the certificate issuer 120 and allowed to make reference to the issue management database 125, in order to let the certificate verifier verify whether the certificate received from the applicant is true or not. In the embodiment, although no particular description is made, for example, "valid access number-of-time" may be set to 1 (one) if the applicant pays three hundred yen for the fee, and the "valid access number-of-times" may be set to 3 (three) if the applicant pays five hundred yen for the fee. Alternatively, the "valid access number-of-times" may be set by the applicant, or may be set without variation by the certificate issuer. As shown in FIG. 3C, in the "access history", the IP address which is a reference source or the like is recorded when the certificate verifier has made reference to the issue management database 125. Incidentally, the embodiment has described the case where the database is classified into the certificate database and the issue management database, and the personal certification ID is recorded both in the certificate database and the issue management database so as to associate the personal certification ID with the issued certificate data and the microchip ID. However, the issued microchip ID and the expiration time or the like may be additionally stored in the certificate database, in association with the personal certification ID.

Next, the certificate issuer sends the certificate data to the print terminal (Step 406).

Next, the print terminal prints out the received certificate data by the printer (Step 407).

The embodiment has described the case where, after the print terminal 110 has received the certificate data from the certificate issuer 120, the print terminal 110 prints out the certificate data by the printer 115. Alternatively, after the microchip ID is read by the microchip reading device 111 and sent to the certificate issuer 120, printing may not be performed until the microchip ID in the print form is read again so as to verify whether the microchip ID read again is identical with the microchip ID sent to the certificate issuer 120 or not. In this manner, the print form can be prevented from being intercepted from the printer 115 by an unscrupulous person and the certificate data received from the certificate issuer 120 can be prevented from being printed on another form. Alternatively, reading of the microchip ID and printing of the certificate data on the print form may be carried out at another timing.

Figure 5:
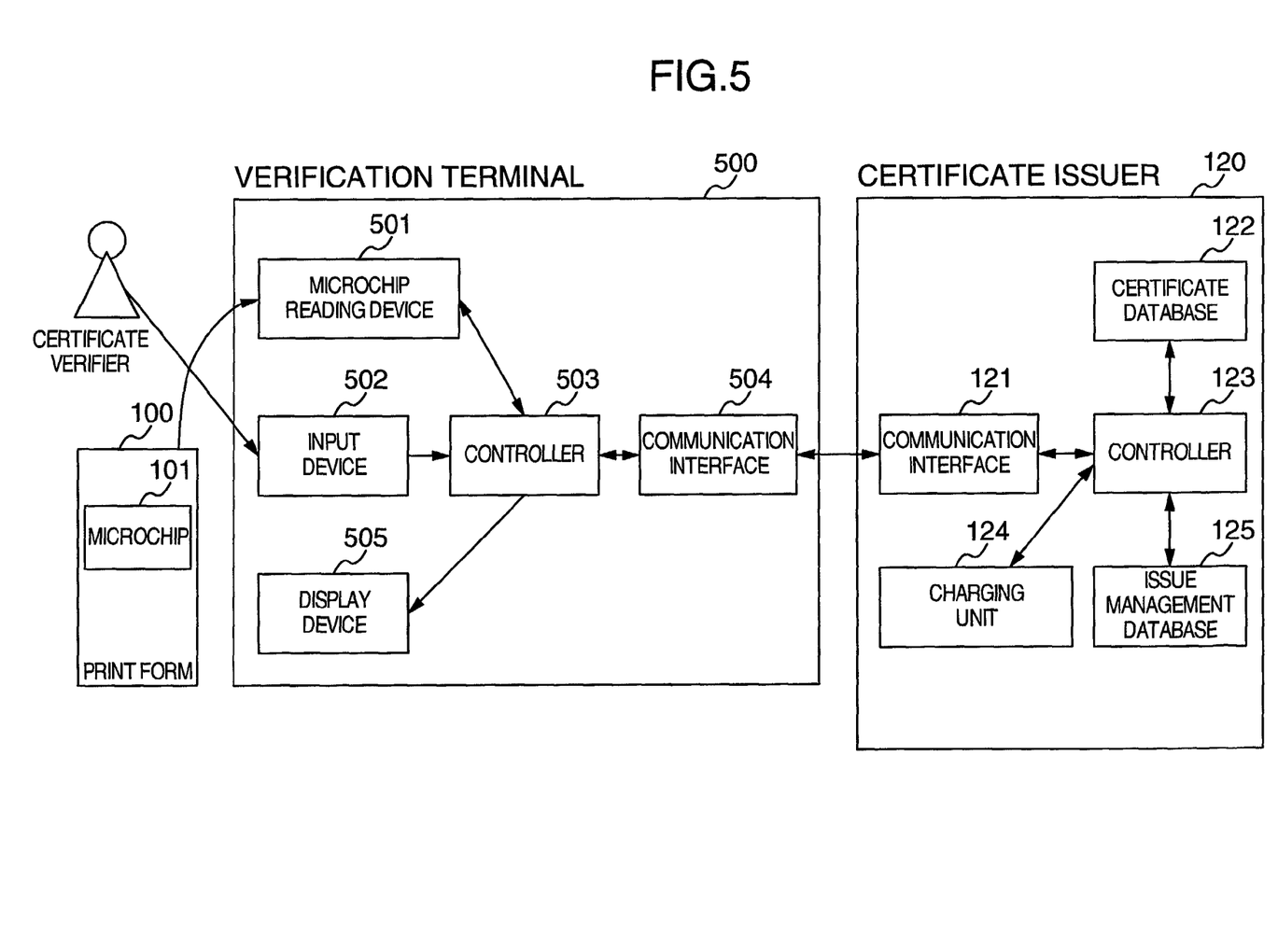
FIG. 5 is a block configuration diagram showing another embodiment of the present invention.
Figure 6:
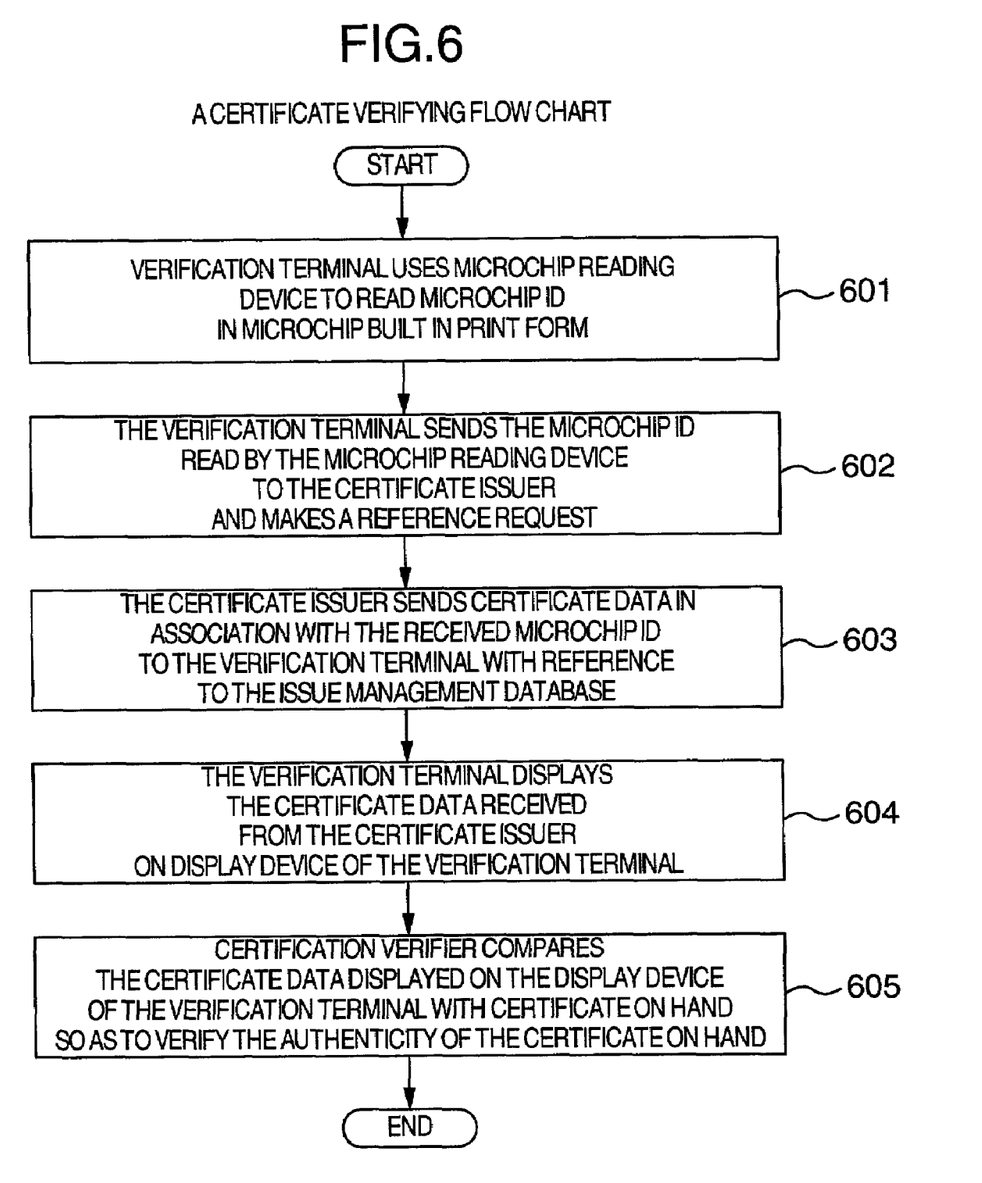
FIG. 6 is a certificate verifying flow chart.

Next, FIG. 5 shows a block diagram of a verification terminal for verifying whether a certificate that a certificate verifier is received from an applicant is true or not. The verification terminal 500 is constituted by a microchip reading device 501, an input device 502, a controller 503, a communication interface 504 and a display device 505. With reference to FIG. 6, description is made about the flow in which the certificate verifier verifies the authenticity of the certificate by use of the certificate verifying terminal. First, a verification terminal 500 reads microchip ID of a microchip built in a print form by use of the microchip reading device 501 (Step 601).

Next, when the verification terminal 500 requests verification of a certificate, the verification terminal 500 sends the microchip ID read by the microchip reading device 501 to the certificate issuer 120 which verifies the certificate (Step 602). The microchip ID may be used as a key. The certificate issuer 120 sends certificate data to the verification terminal 500 with reference to the issue management database and the certificate database (Step 603). The verification terminal 500 displays the certificate data received by the certificate issuer 120 on the display device 505 of the verification terminal 500 (Step 604). The certificate verifier compares the certificate data displayed on the display device 505 of the verification terminal 500 with the certificate on hand so as to verify the authenticity of the certificate on hand (Step 605). Although the embodiment has described the case where verification as to whether the certificate on hand is true or not is made by comparing the data displayed on the display device with the certificate data of the form on hand, another verification method may be taken so that the received certificate data and the paper data on hand are introduced into OCR and compared with each other. In addition, the embodiment has described the case where the certificate issuer sends the certificate data to the verification terminal, the certificate verifier may use the verification terminal to make access directly to the certificate data of the certificate issuer to thereby verify the certificate data.

Incidentally, when the certificate verifier makes access to the issue management database and makes a request for verification (Step 602), the applicant is notified of the information such as the "IP address" of the certificate verifier that has made access, the "access date" or the like on the registered mail address. By collecting the information such as "mail address", "name", "verification purpose" or the like from the certificate verifier, the certificate issuer may notify the applicant of the above-mentioned information or any other information. In addition, when the applicant is notified, by mail, of the message that there is one access to the issue management database, the applicant personally may make access to the issue management database and check the access history. The applicant may receive a mail and check whether the certificate submitted by the applicant is used in a proper way or not. If the applicant feels distrust of the access purpose from the contents of the access history, the applicant may contact the certificate verifier that had made accessed, in accordance with the information of the access history to thereby check the real situation. On the other hand, if the certificate verifier that had made access cannot be contacted, the applicant may contact the place where the applicant has submitted the certificate to thereby check the real situation. If the problem still cannot be solved by any one of the above-mentioned methods, the procedure of annulling the certificate having the microchip built therein or attached thereto additionally may be taken.

Although no particular description is made in the embodiment, the procedure of annulling the issued certificate is taken by the certificate issuer or the like. Alternatively, the certificate issuer or any other entity may be provided with a device to make an investigation of the certificate verifier that has made accessed to the issue management database and to inform the applicant of the investigation result.

Although the embodiment has described on the assumption that the printer is a microchip-responding printer located at home or the like, the terminal installed at the station, the post office, or the like may be used. Although the embodiment has described the case where the personal certification ID is recorded in the personal certificate device, the certificate data from the certificate issuer may be recorded and retained as digital data. In the embodiment, although no specific description has been made about the method to pay the fee, payment at the personal certification ID issuing window, via the network, by a transfer procedure through the post office or the bank, or any other method may be made. In addition, as for the fee, either cash or electronic money may be accepted.

In the above embodiments, it is understood that appropriate computer programs are provided for the printer terminal, the certification issuer, and the verification terminal. The programs can be written in any appropriate language which provides for the production of code in forms suitable for execution in each of the foregoing devices. Moreover, the programs can be written by those of ordinary in the computer programming arts based on an understanding of the invention as disclosed, without the need for undue experimentation.

What is claimed is:

1. A certificate issuing-verifying method for use in a certificate issuing verifying system comprising (a) a print terminal having print means for printing certificate data on a print form, microchip reading means for reading microchip ID in a microchip attached to said print form, input means for inputting personal certification ID, and print terminal communication means for communications, (b) a certificate issuer system in communication with said print terminal and having certificate issuer communication means for performing communication with said print terminal, certificate storage means for storing said certificate data, and issue management storage means for storing certificate issue management data, and (c) a verification terminal in communication with said certificate issuer system and having microchip reading means for reading microchip ID of a microchip attached to a print form on which certificate data is printed, display means for displaying received data, and verification terminal communication means for communications; the certificate issuing-verifying method comprising:

sending said personal certification ID and said microchip ID to said certificate issuer system from said print terminal through said print terminal communication means;

reading said certificate data in association with said personal certification ID from said certificate storage means of said certificate issuer system;

storing said microchip ID and said certificate data to be issued in association with said issue management storage means of said certificate issuer system after said microchip ID is received at said certificate issuer system through said certificate issuer communication means;

sending said read certificate data through said certificate issuer communication means to said print terminal;

printing said certificate data on said print form having said microchip attached thereto, after said certificate data is received at said print terminal through said print terminal communication means, said microchip having said read microchip ID;

sending a microchip ID of a print form to said certificate issuer system from said verification terminal through said verification terminal communication means, after said microchip ID is read by said microchip reading means of said verification terminal;

reading certificate data in association with said received microchip ID at said certificate issuer system with reference to said issue management storage means and said certificate storage means, and sending said certificate data to said verification terminal through said certificate issuer communication means; and displaying said certificate data on said display means, after said certificate data is received through said verification terminal communication means.

2. The certificate issuing-verifying method according to claim 1, further comprising:

introducing paper data on hand into OCR of said verification terminal for comparison with the received certificate data.

3. The certificate issuing-verifying method according to claim 2, further comprising:

sending a personal identification number, as well as said personal certification ID and said microchip ID, to said certificate issuer system from said print terminal.

4. The certificate issuing-verifying method according to claim 1;

wherein said controller reads a microchip ID and key information read out of said microchip attached to said print form and a personal certification ID inputted by a user and encrypts said microchip ID and said personal certification ID with said key information before sending to said certificate issuer system.

5. The certificate issuing-verifying method according to claim 4;

wherein said controller sends a mail address of said user inputted as well as said personal certification ID; and wherein said verification terminal sends a notification that there is a verification request to said mail address.

6. The certificate issuing-verifying method according to claim 1;

wherein said controller reads a microchip ID and key information read out of said microchip attached to said print form and a personal certification ID inputted by a user and encrypts said microchip ID and said personal certification ID with said key information before sending to said certificate issuer system.

7. The certificate issuing-verifying method according to claim 6;

wherein said controller sends a mail address of said user inputted as well as said personal certification ID; and wherein said verification terminal sends a notification that there is a verification request to said mail address.

8. A certificate issuing-verifying system comprising:

a print terminal having print means for printing certificate data on a print form, microchip reading means for reading microchip ID in a microchip attached to said print form, input means for inputting personal certification ID, and print terminal communication means for communications;

a certificate issuer system communicating with said print terminal and having certificate issuer communication means for performing communication with said print terminal, certificate storage means for storing said certificate data, and issue management storage means for storing certificate issue management data; and a verification terminal in communication with said certificate issuer system and having microchip reading means for reading microchip ID of a microchip attached to a print form on which certificate data is printed, display means for displaying received data, and verification terminal communication means for communications;

wherein said print terminal sends said personal certification ID and said microchip ID to said certificate issuer system through said print terminal communication means;

wherein said certificate issuer system reads said certificate data in association with said personal certification ID from said certificate storage means of said certificate issuer system, stores said microchip ID and said certificate data to be issued in association with said issue management storage means of said certificate issuer system after said microchip ID is received at said certificate issuer system through said certificate issuer communication means, and sends said read certificate data through said certificate issuer communication means to said print terminal;

wherein said print terminal prints said certificate data on said print form having said microchip attached thereto, after said certificate data is received at said print terminal through said print terminal communication means, said microchip having said read microchip ID;

wherein said verification terminal sends a microchip ID of a print form to said certificate issuer system through said verification terminal communication means, after said microchip ID is read by said microchip reading means of said verification terminal, reads certificate data in association with said received microchip ID at said certificate issuer system with reference to said issue management storage means and said certificate storage means, and sending said certificate data to said verification terminal through said certificate issuer communication means, and displays said certificate data on said display means, after said certificate data is received through said verification terminal communication means.

9. The certificate issuing-verifying system according to claim 8, wherein said verification terminal comprises introducing means for introducing paper data on hand into an OCR component for comparison with the received certificate data.

10. The certificate issuing-verifying system according to claim 9, wherein said print terminal sends a personal identification number, as well as said personal certification ID and said microchip ID to said certificate issuer system.

11. The certificate issuing-verifying system according to claim 10, further comprising a controller connected to said microchip reading means and said input means;

wherein said controller reads a microchip ID and key information read out of said microchip attached to said print form and a personal certification ID inputted by a user and encrypts said microchip ID and said personal certification ID with said key information before sending to said certificate issuer system.

12. The certificate issuing-verifying system according to claim 11, wherein said controller sends a mail address of said user inputted as well as said personal certification ID, and wherein said verification terminal sends a notification that there is a verification request to said mail address.

13. The certificate issuing system according to claim 8, further comprising a controller connected to said microchip reading means and said input means, wherein said controller reads a microchip ID and key information read out of said microchip attached to said print form and a personal certification ID inputted by a user and encrypts said microchip ID and said personal certification ID with said key information before sending to said certificate issuer system.

14. The certificate issuing system according to claim 13;

wherein said controller sends a mail address of said user inputted as well as said personal certification ID, and wherein said verification terminal sends a notification that there is a verification request to said mail address.

15. A certificate issuing system comprising:

a print terminal having print means for printing certificate data on a print form, microchip reading means for reading microchip ID in a microchip attached to said print form, input means for inputting personal certification ID, and print terminal communication means for communications;

a certificate issuer system in communication with said print terminal and having certificate issuer communication means for performing communication with said print terminal, certificate storage means for storing said certificate data, and issue management storage means for storing certificate issue management data;

a verification terminal in communication with said certificate issuer system and having microchip reading means for reading microchip ID of a microchip attached to a print form on which certificate data is printed, display means for displaying received data, and verification terminal communication means for communications;

wherein said verification terminal comprises introducing means for introducing paper data on hand into an OCR component for comparison with the received certificate data;

wherein said print terminal sends said personal certification ID and said microchip ID to said certificate issuer system through said print terminal communication means;

wherein said certificate issuer system reads said certificate data in association with said personal certification ID from said certificate storage means of said certificate issuer system, stores said microchip ID and said certificate data to be issued in association with said issue management storage means of said certificate issuer system after said microchip ID is received at said certificate issuer system through said certificate issuer communication means, and sends said read certificate data through said certificate issuer communication means to said print terminal;

wherein said print terminal prints said certificate data on said print form having said microchip attached thereto, after said certificate data is received at said print terminal, said microchip having said read microchip ID;

wherein said certificate issuer system receives a microchip ID of a print form from said verification terminal through said verification terminal communication means, after said microchip ID is read by said verification terminal, reads certificate data in association with said received microchip ID at said certificate issuer system with reference to said issue management storage means and said certificate storage means, and sending said certificate data to said verification terminal through said certificate issuer communication means, and displays said certificate data on said display means, after said certificate data is received from said verification terminal.

16. The certificate issuing system according to claim 15, wherein said print terminal sends a personal identification number, as well as said personal certification ID and said microchip ID to said certificate issuer system.

17. The certificate issuing system according to claim 15, further comprising a controller connected to said microchip reading means and said input means;

wherein said controller reads a microchip ID and key information read out of said microchip attached to said print form and a personal certification ID inputted by a user and encrypts said microchip ID and said personal certification ID with said key information before sending to said certificate issuer system.

18. The certificate issuing system according to claim 17, wherein said controller sends a mail address of said user inputted as well as said personal certification ID, and wherein said verification terminal sends a notification that there is a verification request to said mail address.

* * * * *